(12) United States Patent
Shah et al.

(10) Patent No.: US 6,470,397 B1
(45) Date of Patent: Oct. 22, 2002

(54) SYSTEMS AND METHODS FOR NETWORK AND I/O DEVICE DRIVERS

(75) Inventors: Shishir C. Shah, Irvine, CA (US); Thomas W. Thompson, Costa Mesa, CA (US); David K. Wagner, Vista, CA (US)

(73) Assignee: QLogic Corporation, Aliso Viejo, CA (US)

( * ) Notice: Subject to any disclaimer, the term of this patent is extended or adjusted under 35 U.S.C. 154(b) by 0 days.

(21) Appl. No.: 09/280,506

(22) Filed: Mar. 30, 1999

Related U.S. Application Data

(60) Provisional application No. 60/108,527, filed on Nov. 16, 1998.

(51) Int. Cl.[7] .............................. G06F 15/16; G06F 9/00
(52) U.S. Cl. ........................ 709/250; 709/321; 709/326
(58) Field of Search ................................. 709/250, 251, 709/253, 230, 321, 326, 327; 710/10, 11, 105

(56) References Cited

U.S. PATENT DOCUMENTS

| | | | | |
|---|---|---|---|---|
| 5,491,812 A | * | 2/1996 | Pisello et al. ................ | 709/236 |
| 5,613,096 A | * | 3/1997 | Danknick .................... | 709/236 |
| 5,802,391 A | | 9/1998 | Hwang | |
| 5,905,509 A | * | 5/1999 | Jones et al. .................. | 345/520 |
| 5,991,813 A | * | 11/1999 | Zarrow ........................ | 709/236 |
| 6,044,415 A | * | 3/2000 | Futral et al. .................. | 710/33 |
| 6,118,776 A | * | 9/2000 | Berman ....................... | 370/351 |
| 6,148,346 A | * | 11/2000 | Hanson ....................... | 709/231 |
| 6,173,346 B1 | * | 1/2001 | Wallach et al. .............. | 710/302 |
| 6,202,147 B1 | * | 3/2001 | Slaughter et al. ............... | 713/1 |
| 6,209,023 B1 | * | 3/2001 | Dimitroff et al. ........... | 709/211 |
| 6,233,619 B1 | * | 5/2001 | Narisi et al. ................. | 709/230 |
| 6,233,624 B1 | * | 5/2001 | Hyder et al. ................. | 709/327 |
| 6,314,525 B1 | * | 11/2001 | Mahalingham ................ | 714/4 |
| 6,317,842 B1 | * | 11/2001 | Nguyen ....................... | 713/400 |
| 6,330,626 B1 | * | 12/2001 | Dennin et al. ................. | 710/52 |

FOREIGN PATENT DOCUMENTS

| | | | |
|---|---|---|---|
| EP | 0 581 591 A1 | 2/1994 | |
| GB | 2 298 344 A | 8/1996 | |
| GB | 2 308 904 A | 7/1997 | |
| WO | WO 94/06091 | 3/1994 | |
| WO | WO 00/295029 | * 5/2000 | ............. C11D/1/00 |

OTHER PUBLICATIONS

"qCluster" QLogic's Clustering Solution, distributed Nov. 17, 1997.

* cited by examiner

Primary Examiner—Zarni Maung
Assistant Examiner—Jason D. Cardone
(74) Attorney, Agent, or Firm—Knobbe, Martens Olson & Bear, LLP

(57) ABSTRACT

The present invention is directed to systems and methods for transferring storage data and network data using the same interface circuit. Storage data is transferred from an upper layer storage driver to a lower layer storage driver. Network data is transferred from a network driver to the lower layer storage drive. The storage data and the network data are transferred to a communications link interface circuit, wherein the storage data is transferred using a storage protocol and the network data is transferred using a network protocol.

35 Claims, 5 Drawing Sheets

SYSTEMS AND METHODS FOR NETWORK AND I/O DEVICE DRIVERS

The present application claims priority from U.S. Provisional Patent Application No. 60/108,527 filed on Nov. 16, 1998. The contents of that application, in its entirety, is hereby incorporated by reference.

BACKGROUND OF THE INVENTION

1. Field of the Invention

The present invention relates to methods and systems for handling network and I/O communications, and in particular, to network and I/O device drivers.

2. Description of the Related Art

Computer systems typically utilize an operating system that provides an interface between application programs and the hardware. For example, operating systems are used to schedule tasks, allocate storage, and handle the interface to peripheral hardware, such as hard drives, optical disk drives, tape drives, network devices and the like. The operating system may be split into a kernel and various system programs. The system programs use facilities provided by the kernel to perform higher-level housekeeping task, often acting as servers in a client-server relationship.

As previously discussed, an operating system interfaces application programs to hardware. For example, an application program may transmit a request to access peripheral hardware. This request is received by the operating system, which in turn translates the request to a format useable by the device. The operating system then transmits the translated request to the appropriate device and handles communications with the device.

The software used to control a peripheral device is typically called a device driver. A driver is usually a routine or set of routines that implements device-specific aspects of generic I/O operations. The device driver may be responsible for accessing the hardware registers of the device, starting and completing I/O operations, performing error processing, and often includes an interrupt handler to service interrupts generated by the device. Device drivers are typically kernel mode drivers and often form part of the lowest level of the operating system kernel, with which they are linked when the kernel is built. Some operating systems, such as Windows NT, have loadable device drivers that can be installed from files after the operating system is running.

In Windows NT, an I/O manager handles communication between a driver and an application program or kernel component. The I/O manager responds to an I/O request by issuing an I/O request packet to the appropriate device driver. The driver translates the request into an appropriate form for the targeted device and causes the device to begin the requested I/O operation. Once the device completes the I/O operation, the device generates an interrupt which is serviced by the device driver. The I/O manager then completes the I/O request by performing a variety of operations, including, for example, recording the outcome of the I/O operation.

Some operating systems, such as Windows NT, or UNIX, use a layered approach in implementing device drivers. These operating systems allow several driver layers to exist between an application program and a device. For example, one or more intermediate drivers may be layered on top of a physical device driver. These intermediate driver layers allow hardware-specific operations to be separated from more general management issues. In Windows NT parlance, one such intermediate driver type is referred to as a "class driver," while the hardware driver is called a "port driver."

One example of a device driver is a SCSI drive device driver. The SCSI device driver typically consists of several layers. For example, the SCSI device driver may include a class driver, a SCSI port driver, and a SCSI miniport driver. When an application program issues a read request for a file located on the disk, the operating system invokes the appropriate SCSI class driver and passes the read request to the class driver. The class driver translates the received I/O request packets into I/O request packets with system defined SCSI request blocks (SRBs) containing SCSI command descriptor blocks. The translated I/O request packets are then sent to the next lower driver, which may be, for example, a SCSI port driver. The SCSI port driver translates the SCSI request blocks from the class driver and passes the SCSI request blocks and the command descriptor blocks to the SCSI miniport. The SCSI miniport driver is dynamically linked with the SCSI port driver and provides hardware-specific support for a particular SCSI host bus adapter (HBA). The SCSI drive performs the read operation and generates an interrupt to the SCSI miniport that then services the interrupt.

Another example of a device driver is a network driver. The network driver handles communication with networking hardware, such as a NIC (Network Interface Card). Many operating systems, such as Windows NT, use driver layering to disengage network protocol management from actual data transfers. Thus, a network driver may include a Windows NT LAN (Large Area Network) driver followed by an NDIS or NIC miniport driver. The network driver layers may be interconnected using a Windows NT NDIS (Network Device Interface Specification) interface. In conventional systems, the NDIS miniport driver interfaces to the NIC. Thus, in conventional systems, the NDIS miniport performs the hardware-specific operations needed to manage the NIC.

Many conventional computer systems include at least two interface cards, an I/O HBA and a network interface card, to respectively handle I/O and network protocols. As described above, these cards are managed respectively by a SCSI miniport and an NDIS miniport. Each card is typically connected to separate communication media. For example, the I/O HBA might be connected to a high speed Fibre Channel communication link, which in turn might be connected to one or more server systems or other computer systems. The Fibre Channel link would then handle storage related communications. The NDIS miniport might be connected via a NIC to an Ethernet link, which in turn may be connected to other computer systems. The Ethernet link would then handle the network related communications, such as, in the case of a clustered server system, "heartbeat" information. The network heartbeat traffic is typically much less than the storage related traffic, and therefore the lower bandwidth, lower cost, Ethernet link is considered well suited to handle such lower bandwidth communication. Thus, for example, in a typical clustered server system having host systems and storage subsystems, each host system would have at least one I/O HBA and one Ethernet interface card. In addition, each storage subsystem would have at least one I/O HBA. The host systems communicate heartbeat information to each other over the Ethernet link. Both the host systems and the storage subsystems communicate storage information over the Fibre Channel.

However, the conventional approach described above disadvantageously requires at least two slots in each host system computer, one for the storage or I/O HBA and one for the NIC, and two communication links, in order to handle both storage related communication and network related communication. This situation is further exacerbated in systems incorporating redundant channels for both the storage and communication links. In conventional systems, such redundancy requires four host bus adapters, which in turn require four card slots in each host computer system. However, many standard computers have a very limited number of slots available. Hence, in order to accommodate four HBAs, either a non-standard, larger chassis is required, or an additional chassis having additional slot positions must be connected to the host computer system. Either alternative results in an expensive, large system.

SUMMARY OF THE INVENTION

One embodiment of the present invention advantageously enables both network protocol and an I/O protocol to be transferred to a communication link using the same interface circuit. For example, in one embodiment two or more computer systems are interconnected using a communication link, such as a Fibre Channel link. Both an I/O protocol, such as a SCSI protocol, and a network protocol, such as an Internet protocol (IP), are used to transmit data over the same Fibre Channel link using the same host bus adapter. Thus, in comparison with conventional systems, one embodiment of the present requires half as many communication links and half as many host bus adapters to carry data using both SCSI and IP protocols.

The reduction in the number of communication links and the number of host bus adapters is even greater in networked systems having redundant links. For example, in one embodiment of the present invention, two or more computer systems are interconnected using two communication links. During normal operation, one link is used to carry data using an I/O protocol, such as SCSI, while the other link is used to carry data using a network protocol, such as IP. In the event of failure of either one of the two links, one embodiment of the present invention detects the failure and uses the remaining link to carry data using both the I/O and network protocols. Thus, one embodiment of the present invention provides redundant links for both network and I/O protocol data using two links and two host bus adapters. This contrasts with conventional systems, which typically use two redundant communication links and two host bus adapters for I/O protocol data, and two additional redundant links and two additional host bus adapters for network protocol data.

DETAILED DESCRIPTION OF THE PREFERRED EMBODIMENT

The present invention provides methods and systems for running network and storage protocols over the same communication link. Thus, by way of example, one embodiment of the present invention advantageously reduces the number of interface cards, interface circuits, and communication links, required to network clustered server systems together. The reduction in the number of interface cards, interface circuits, and communication links provides for reduced costs and smaller systems as compared with conventional systems.

Figure 1:
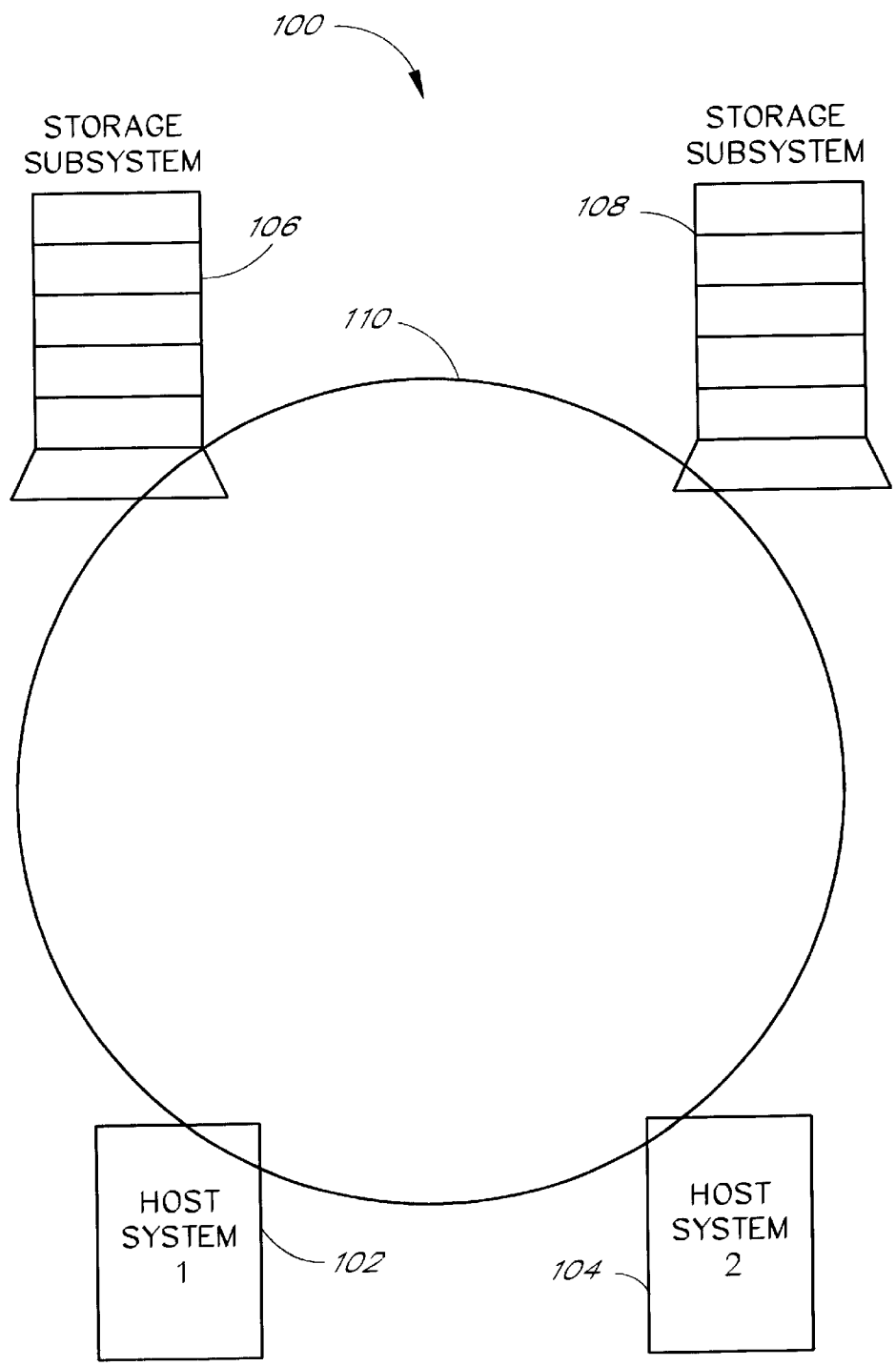
FIG. 1 illustrates one embodiment of the present invention.

FIG. 1 provides an overview of the hardware of an exemplary system incorporating one embodiment of the present invention. The illustrated system is a clustered server system. A clustered server system typically includes two or more independent severs that can access a common body of data storage and provide services to a common set of clients. However, the present invention is not limited to clustered server systems. For example, the present invention can be incorporated into other systems that utilize both network and storage protocols.

As illustrated in FIG. 1, the exemplary system 100 includes two storage subsystems 106, 108 and two host systems 102, 104, though the clustered server system 100 can have more or fewer host systems and storage subsystems. Each storage subsystem 106, 108 and host system 102, 104 may include one or more processors, such as, by way of example, a Pentium® II processor or an Alpha® processor. In one embodiment, each host system 102, 104 is running an operating system, such as Microsoft Windows® NT versions 4 or 5, or Unix. For the purposes of illustrating exemplary embodiments of the present invention, it will be assumed that the systems are running a version of Microsoft Windows® NT. Each storage subsystem 106, 108 and host system 102, 104 typically includes random access memory, as well as hard drives and optical drives, such as a CD-ROM drive or a DVD drive (not shown). In addition, each host system typically includes an interface card, such as a host bus adapter (not shown) from one of the QLogic ISP21xx or ISP22xx families. In one embodiment, the host adapter has a processor, such as CISC (complex instruction set computer) or a RISC (reduced instruction set computer) processor, and memory, such as RAM or EEPROM. In one embodiment, at least a portion of the memory is used to hold adapter code downloaded from the host computer system. In one embodiment, each host adapter is located on a separate circuit card. In another embodiment, more than one host adapter is located on a circuit card. Each host bus adapter card is typically connected to a local computer bus slot, such as a PCI bus slot.

In contrast to conventional systems, the system 100 illustrated in FIG. 1 runs both storage and network communications using the same host bus adapter interface circuit on a common communication link 110. Thus, in contrast to conventional systems, which use two interface cards and two corresponding communication links per host system, the embodiment illustrated in FIG. 1 only needs one interface card or circuit and one communication link per host system. Furthermore, as discussed below, in one embodiment, use of the present invention is transparent to the operating system. Additionally, in one embodiment of the present invention, Windows NT standard class drivers may be used without modification.

In one embodiment of the present invention, the cluster storage protocol is a SCSI protocol, such as SCSI II, while the network protocol is the Internet Protocol (IP). In one embodiment, the communication link 110 connecting the various cluster systems or "nodes" is a Fibre Channel Loop (FCL). Fibre Channel is a high-speed data transfer interface technology that advantageously maps common transport protocols, such as SCSI and IP. Thus, using Fibre Channel technology, it is possible to merge high-speed I/O, such as SCSI, and networking functionality in a single connectivity technology. However, alternative embodiments can use other bus technologies, such as a SCSI bus, to run both I/O and networking protocols on a common link. Thus, in one embodiment, the network and storage packets are transferred between computer systems using standard network and I/O protocols, such as the IP and SCSI protocols. This embodiment may be used when the HBA, such as one based on the QLogic ISP2200, supports both IP and SCSI protocols. In another embodiment, if the HBA supports the SCSI protocol, but not the IP protocol, the network packets are encapsulated in SCSI packets or commands. In the "encapsulation" embodiment, the HBA may support the SCSI target mode, as well as the more typical initiator mode, thereby allowing the HBA to receive SCSI packets encapsulating IP packets.

The Fibre Channel Loop 110 is connected to the host bus adapter of the host systems 102, 104 and the storage subsystems 106, 108. Thus, storage and network packets can be routed between the host systems 102, 104 and the storage subsystems 106, 108. The data transferred using the IP protocol may include "heartbeat" related information. "Heartbeats" are transferred across the clustered nodes to ensure that everything is properly synchronized, and so that each node can ensure that the other nodes are functioning.

The Fibre Channel Loop 110 is connected to the host bus adapters residing in each node 102–108. Thus, data is transferred from and to the Fibre Channel Loop 110 via respective host bus adapters. The operating systems running each node communicate with their respective host bus adapters using device drivers. In one embodiment, the device driver is responsible for accessing the host bus adapter's internal registers, starting and completing I/O operations, performing error processing, and servicing interrupts generated by the device.

Figure 2:
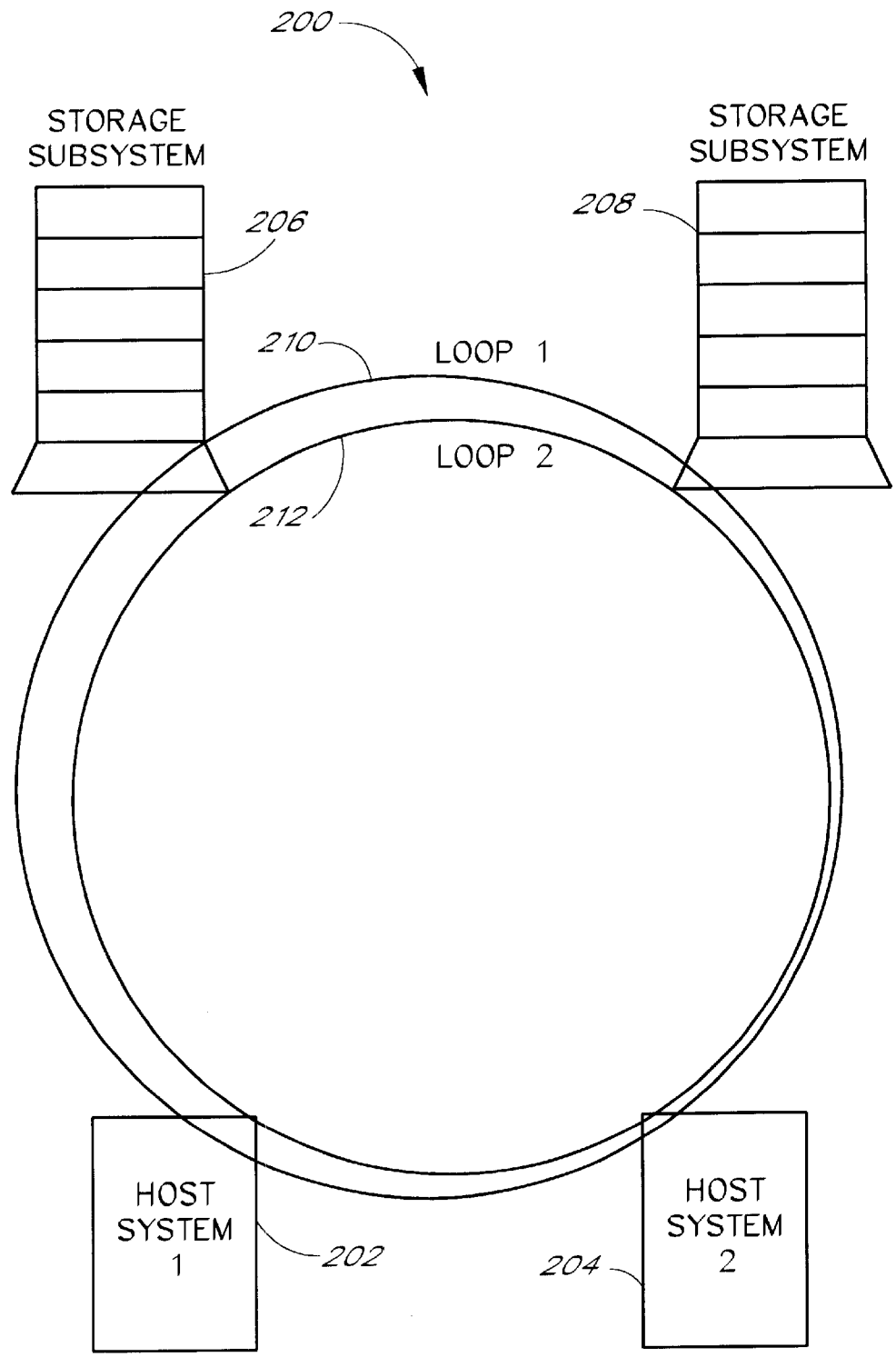
FIG. 2 illustrates one embodiment of the present invention with redundant communication links.

In one embodiment, a fail-over path is provided to ensure high reliability and to avoid a shutdown of the clustered sever system in the event of a communication link failure. By way of example, FIG. 2 illustrates a clustered server system 200 which has two Fibre Channel Loops 210, 212. In normal operation, Loop 1 210 handles the I/O traffic, while Loop 2 212 handles the network traffic. Thus, both communication loops 210, 212 are efficiently utilized in normal operation, with the bandwidth of Loop 1 allocated to I/O traffic, and the bandwidth of Loop 2 allocated to network traffic. However, in the event of a Fibre Channel Loop failure, such as the failure of Loop 1 210, one embodiment of the present invention detects the failure. Upon detecting the failure, the remaining operating Fibre Channel Loop, such as Loop 2 212, is used as a fail-over path to carry both network traffic and I/O traffic. Thus, in contrast to conventional systems, which would utilize four communication links to provide redundancy for both network and I/O traffic, the illustrated embodiment 200 of the present invention utilizes two communication links 210, 212. Furthermore, in contrast to conventional systems, which would utilize at least two HBAs and two NICs to provide such redundancy, the illustrated embodiment 200 uses two HBAs per host system 202, 204 to provide the desired fail-over path.

In one embodiment, the fail-over technique operates as follows. Typically, a Windows NT Cluster Administrator is used to manage and configure network paths and storage devices. In conventional systems, if multiple network paths, with corresponding multiple communication links, have been configured, one path is designated as the primary network path. If the Cluster Administrator determines, via a loss of signal indication or the like, that it is unable to communicate over the primary path, the Windows NT Cluster Administrator can switch to a secondary network path and a corresponding secondary communication link. In contrast to conventional systems, one embodiment of the present invention permits the I/O bus, such as the SCSI bus or the Fibre Channel loop, to be configured as a secondary or primary network path in addition to acting as a I/O or storage path. Thus, upon detection of a network path failure, the Windows NT Cluster Administrator can fail-over to the I/O bus.

Figure 3:
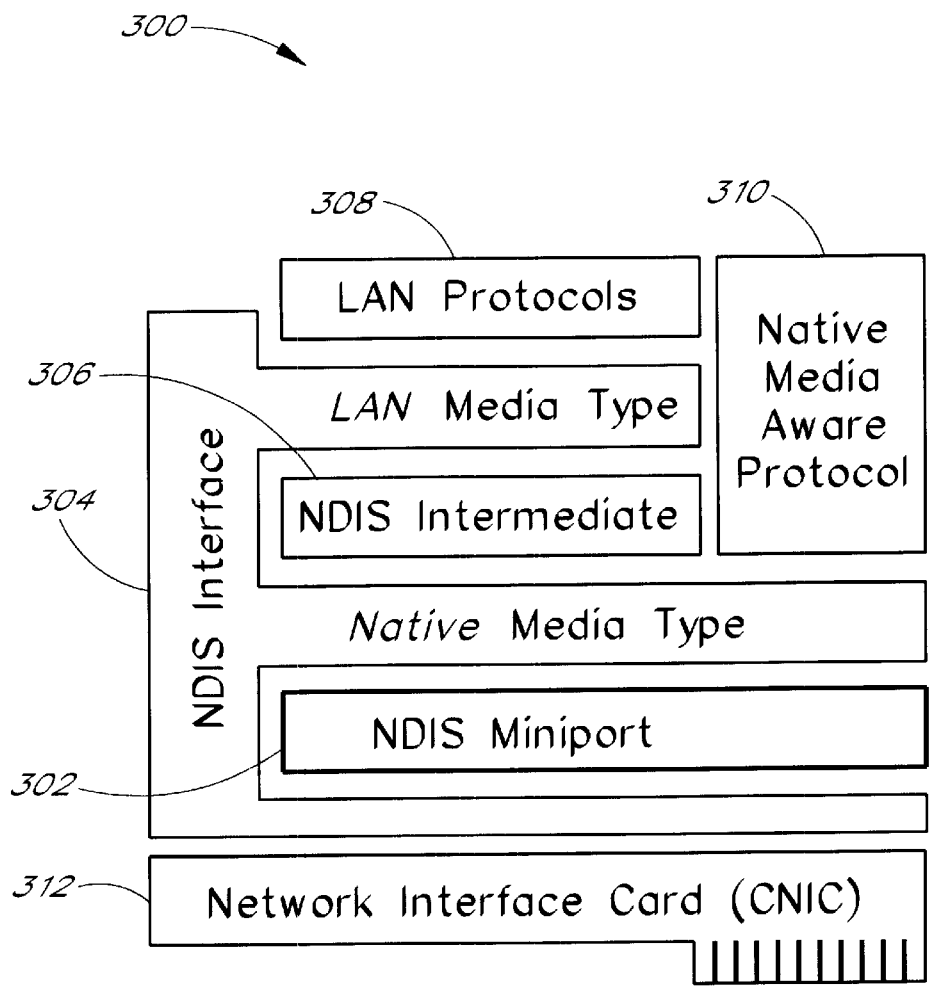
FIG. 3 illustrates a conventional network driver architecture.

To better illustrate the software architecture of one embodiment of the present invention, a description of conventional NIC and SCSI drivers will now be discussed. FIG. 3 illustrates a conventional Windows NT NDIS (Network Device Interface Specification) driver architecture 300. An NDIS interface 304 forms a wrapper about an NDIS NIC miniport driver 302, thus providing an interface between the NDIS NIC miniport driver 302, one or more NDIS intermediate drivers 306, LAN protocol drivers 308, and native-media-aware protocol drivers 310. Additionally, the NDIS interface 304 provides common, pre-defined functions to the interface between the NDIS NIC miniport driver 302 and the NIC 312. The NDIS NIC miniport 302 uses these pre-defined functions, which in turn call other components, to manage the NIC 312 hardware.

Figure 4:
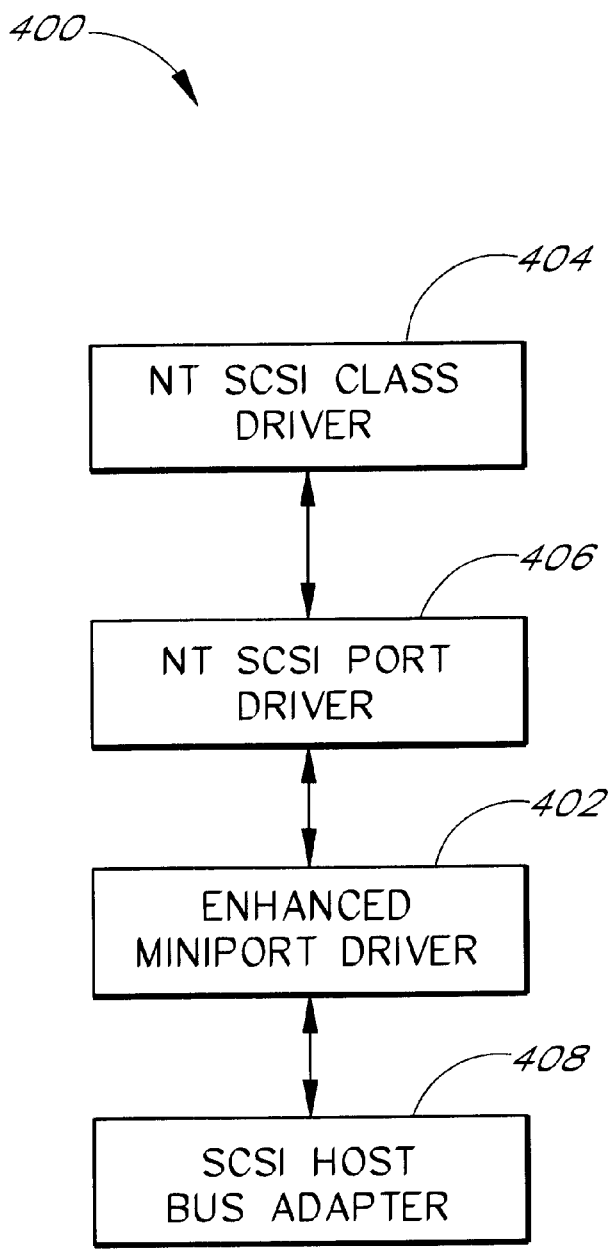
FIG. 4 illustrates a conventional I/O driver architecture.

FIG. 4 illustrates a conventional Windows SCSI driver architecture 400. At the upper level is a SCSI class driver 404. The SCSI class driver 404 translates I/O requests received from application programs and the like via I/O system services. The translated I/O requests are in the form of packets with system defined SCSI request blocks containing SCSI command descriptor blocks. The translated I/O request packets are then sent to the next lower driver, for example, a SCSI port driver 406. The SCSI port driver 406 translates the SCSI request blocks from the class driver 404 and passes the SCSI request blocks and the command descriptor blocks to the SCSI miniport driver 402. The SCSI miniport driver 402 is dynamically linked with the SCSI port driver 406 and provides hardware-specific support for a particular SCSI host bus adapter 408. The SCSI driver 400 may include other optional driver layers as well, such as encryption drivers or filter drivers. Thus, as illustrated in FIGS. 3 and 4, in conventional systems the NIC driver 300 and SCSI driver 400 independently interface to their respective interface cards 312, 408.

Figure 5:
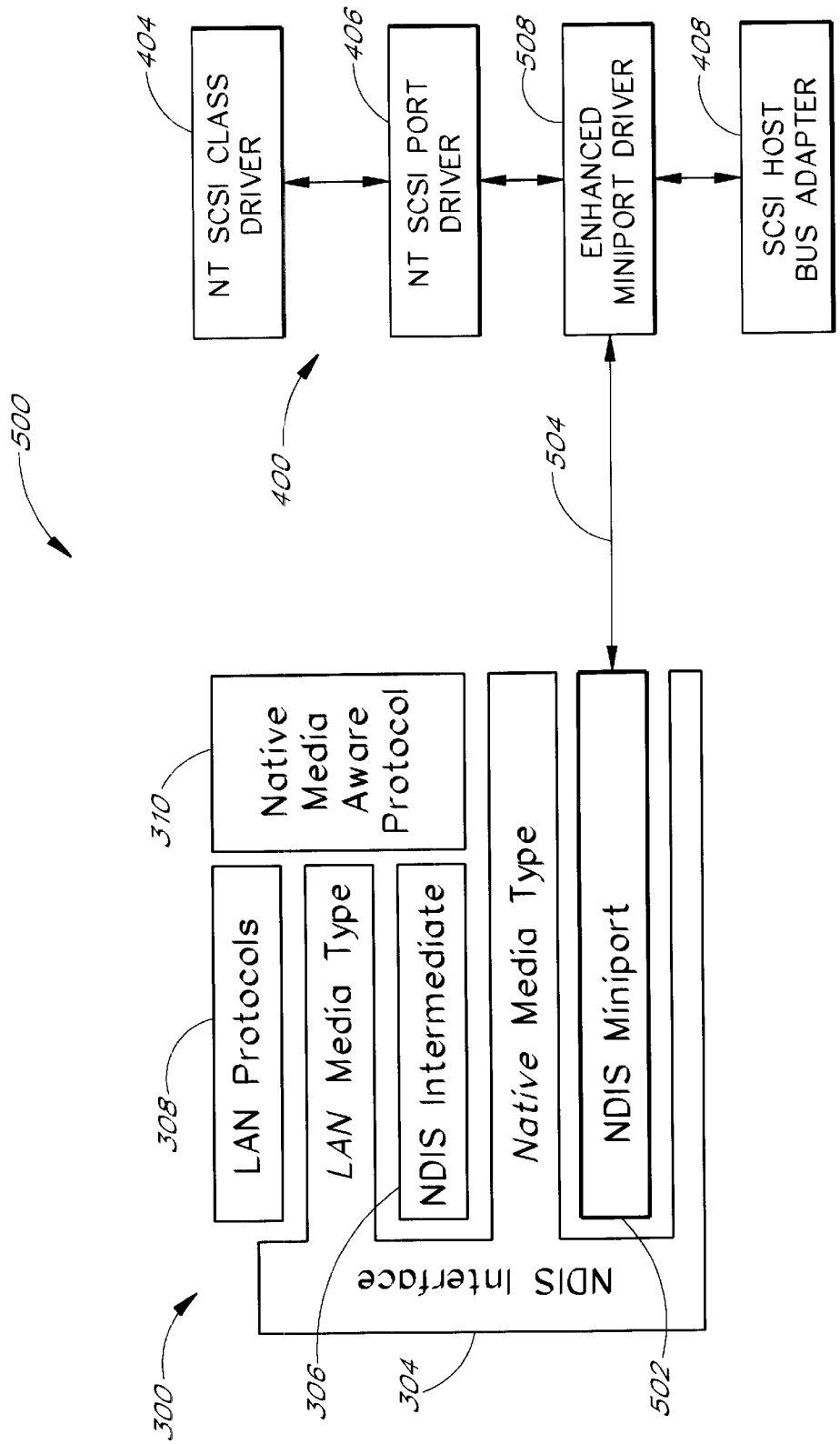
FIG. 5 illustrates one embodiment of the driver architecture of the present invention.

The software architecture and operation of the embodiment 100 illustrated in FIG. 1 will now be discussed in detail. FIG. 5 illustrates one embodiment of a driver architecture 500 of the present invention. For example, the illustrated embodiment 500 could be used in one of the host systems illustrated in FIGS. 1 or 2. The upper layers of the NIC driver and the SCSI driver are similar to those found in the conventional driver architectures 300, 400 illustrated in FIGS. 3 and 4. However, in contrast to the NIC miniport 302 illustrated in FIG. 3, which interfaces to its own network interface card 312, the NDIS miniport 502 illustrated in FIG. 5 redirects communication to an enhanced SCSI miniport driver 508 via an interface 504. The enhanced SCSI miniport driver 508, in turn, routes network traffic from the NDIS miniport 502 onto the common Fibre Channel Loop 110 illustrated in FIG. 1. Therefore, in one embodiment, the network miniport driver 502 and the SCSI miniport driver 508 allow host-to-host network traffic to be overlaid onto a Fibre Channel bus, or, in an alternative embodiment, onto a SCSI bus. This permits the host-to-host traffic to operate in parallel with normal disk storage related traffic on the same bus. Thus, the enhanced driver 502, 508, in combination with the HBA, emulate the network interface card (NIC).

Thus, in one embodiment, the NDIS miniport driver 502 emulates an Ethernet connection between multiple systems sharing a common Fibre Channel or SCSI bus. This Ethernet emulation is overlaid by the enhanced SCSI miniport onto the same data channels used to access disk devices shared between the clustered systems. As previously described with reference to FIG. 1, this approach particularly benefits clustered systems that are running short on card slots, such as PCI slots. In addition, as previously described with reference to FIG. 2, in one embodiment, the present invention can provide additional fail-over paths to backup NIC adapters used for local host-to-host communications. In one embodiment, the network driver is adapter-type independent and supports multiple Ethernet emulations through multiple enhanced miniport drivers simultaneously.

In one embodiment, several features are incorporated into the driver architecture 500 to enable the enhanced SCSI miniport 508 to handle both the NDIS miniport communications and the standard SCSI miniport communications. For example, the SCSI miniport 508 is enhanced with additional entry points to accommodate the connection to the NDIS miniport 502. These additional entry points are termed "backdoor" entry points. Similarly, the NDIS miniport 502 addresses communications to the additional SCSI miniport entry points, rather than to the network interface card.

In addition, because the SCSI miniport 508 is not aware of physical addresses of the NIC command data stored in the host system memory, the SCSI miniport 508 cannot build the scatter/gather list for the network related command data and data buffers. As is understood by one of ordinary skill in the art, scatter/gather lists are used to track logically contiguous data that have non-contiguous physical addresses. Thus, in one embodiment, one or more upper layer drivers generate the scatter/gather list for the network data. For example, a SCSI filter driver, the SCSI port driver 406, and/or the NDIS driver 502 may complete the scatter/gather list. The scatter/gather list is then passed to the SCSI miniport 508 via a SCSI Request Block (SRB) extension, as discussed below.

In addition, the SRB extension is used to pass pointer and context parameter information for a Command Callback routine. The Command Callback routine is called by the miniport driver 508 as each command is completed. The Command Callback routine places a pointer to the completed command into a queue of completed command pointers, schedules a DPC (Deferred Procedure Call) service routine, and then returns.

An exemplary backdoor (BD) SRB extension shown below contains link pointers, a completion routine pointer and context, a scatter/gather count, and a list of scatter/gather elements. The exemplary SRB extension may be used when network packets are to be encapsulated in SCSI packets before the packets are transferred over the communications link.

```
typedef struct _BD_SRB_EXTENSION
{
    SRB_EXTENSION          stdExt;
    PSCSI_REQUEST_BLOCK    nextSrb;
    PSCSI_REQUEST_BLOCK    previousSrb;
    PCOMPLETION_CALLBACK   completionRoutine;
    PVOID                  completionContext;
```

-continued

```
    PVOID                  driverContext;
    LONG                   sgEntryCnt;
    BD_SG_ELEMENT          sgList[MAX_SG_ENTRIES];
} BD_SRB_EXTENSION, *PBD_SRB_EXTENSION;
```

The PSCSI_REQUEST_BLOCK is a standard NT type, as is PVOID, indicating that the associated parameter is untyped, and LONG, indicating that the associated parameter is 32 bits. The nextSrb and the previousSrp parameters are SRB pointers associated with, respectively, the previous and the next SRB. These pointers are used to chain or queue SRBs. When the enhanced SCSI miniport 508 is finished with a given SRB, the SCSI miniport 508 calls the Completion Callback routine identified by the completionRoutine parameter, and passes the completion context parameter completionContext. The driverContext parameter is used as a scratchpad to store context related information needed to return to a previous context upon a command completion. The sgEntryCnt and sgList parameters are used to pass the number of scatter/gather entries and the entries themselves.

In addition, several items are added to the SCSI driver object extension structure for supporting the enhanced miniport 508. This structure is allocated for each adapter managed by the SCSI miniport 508 for keeping HBA context. The structure includes the following:

A spinlock used to synchronize access to a request queue for the HBA processor and to a SRB request queue.

A port database array containing a list of the SCSI, network, and other devices, currently connected. The port database array is typically built during driver initialization using data received from corresponding HBAs.

Pointer and context parameter information, including information for imported Notification Callback routines and imported Get Buffer routines described below.

In one embodiment, a host or storage system may be multiprocessor-based. The host or storage system may further include an operating system configured to run on either a uniprocessor system or a multiprocessor system, such as a Symmetric Multiprocessor System (SMP). One problem that arises in multiprocessor systems is synchronizing two threads of execution that share resources that can be accessed at the same time on a multiprocessor computer. For example, two threads could be running simultaneously on different processors and attempting to modify the same data. Such accesses need to be synchronized. Windows NT utilizes locks, such as spinlocks, to provide a synchronization mechanism for protecting resources shared by kernel-mode threads running at interrupt level. A spinlock handles synchronization among various threads of execution running concurrently on a multiprocessor computer. A thread acquires a spinlock before accessing protected resources, such as data structures. The spinlock keeps any thread except the one holding the spinlock, from using the resource. A thread that is waiting on the spinlock loops, or "spins" attempting to acquire the spinlock until it is released by the thread holding the spinlock. Since only one processor at a time can own a spinlock, the resource is safe from collisions.

A typical use for a spinlock is to protect a queue used by more than one layer of a driver. For example, a miniport function might queue packets passed to it by a protocol driver. Because other driver functions also use this queue, the miniport function needs to protect the queue with a spinlock, so that only one thread at a time can manipulate the links or contents. The miniport function acquires the spinlock, adds the packet to the queue, and then releases the spinlock. Using a spinlock ensures that the thread holding the spinlock is the only thread modifying the queue links while the packet is safely added to the queue.

In one embodiment of the present invention, the enhanced SCSI miniport 508 uses a spinlock to synchronize access to a host bus adapter processor request queue, used to pass SCSI and IP packets to the HBA processor, and the SCSI Request Block (SRB) queue.

In addition, the device extension structure is used to store pointer and context parameter information for the Notification Callback routine and the Get Buffer routine. The Notification Callback routine may be used to pass error types, such as a loop down error, for communication to other drivers needing the information.

The driver architecture is further supported by a variety of routines. Some of these routines are standard or modified Windows NT-type routines, such as a Driver Entry routine, a Find Adapter routine, an Initialize Adapter routine, a Start IO routine, an Interrupt Service routine, an interrupt DPC routine, as well as other routines discussed below.

One embodiment of a procedure for initializing and utilizing the SCSI miniport 508 will now be described. Initially, a Driver Entry routine is executed when the miniport driver is loaded. The Driver Entry routine builds and returns a hardware initialization data structure to the SCSI port driver. The hardware initialization data structure includes information which identifies the HBA type supported by the SCSI miniport driver 508, as well as other SCSI miniport driver entry points which may be called by the SCSI port driver. In one embodiment, no modifications of the Driver Entry routine are required for the enhanced miniport driver.

Next, a Find Adapter routine is called for each instance of the SCSI miniport driver adapter-type found in the computer system. The Find Adapter routine builds and returns a port configuration information data structure to the SCSI miniport driver 508. The port configuration information data structure includes information related to the characteristics of the SCSI miniport driver 508 and the HBA. In addition, in one embodiment, the Find Adapter routine sets the initial state of the spinlock used to control access to the HBA processor request queue. The Find Adapter routine may also set the initial synchronization interrupt request (IRQ) level to dispatch level to ensure that other processes can be run in parallel. Furthermore, in the embodiment where the IP packets are encapsulated in a SCSI packet, the Find Adapter routine will initialize the "initialize inquiry" data used for target mode response to inquiry commands received from other connected systems. This last step is used to ensure that the other connected systems are aware that the present system is capable of encapsulating IP packets in SCSI packets.

During system initialization, an Initialize Adapter routine is called once for each host adapter found in the system. The Initialize Adapter routine is responsible for initializing the host adapter, which, in one embodiment, includes resetting the host adapter processor, downloading code to the host adapter, and starting and initializing the host adapter code. For the enhanced SCSI miniport driver 508, the Initialize Adapter routine will also initialize the port database, and, if IP packets are to be embedded in SCSI packets, enable the host adapter target mode so that the HBA can receive as well as transmit SCSI commands.

A StartIO routine is called by the SCSI port driver to pass an SRB, containing a command, to the enhanced SCSI miniport 508 for execution. In a Windows NT driver, the StartIO routine is responsible for starting an I/O operation on the physical device. In one embodiment, the StartIO routine is enhanced to reserve and release the spinlock when accessing the host bus adapter processor queue and the SRB queue.

In one embodiment, the StartIO routine is further enhanced to support two additional commands. The first command, termed the "IOCTL_BD_INQUIRY" command, is used to locate host bus adapters being managed by the enhanced SCSI miniport 508. This command gets the StartIO IRQ level that is used for synchronized access to the spinlock-controlled resources, and saves the IRQ level in the device extension. This command also exports the backdoor StartIO entry point and the entry point for the Reset routine as discussed below.

One embodiment of a data structure associated with the IOCTL_BD_INQUIRY command, which may be used when the network packets are encapsulated in storage or I/O packets, is as follows:

```
typedef struct     _BD_INQUIRY_DATA
{
    ULONG               options;                              // Export miniport supported options
    PSTARTIO_BACKDOOR   startIoRoutine;                       // Export backdoor StartIo entry
    PVOID               startIoContext;                       // Export miniport pDevExt pointer
    PRESET_BACKDOOR     resetRoutine;                         // Export backdoor Reset entry
    PVOID               resetContext;                         // Export miniport pDevExt pointer
    USHORT              numberBuses;                          // Export adapter bus count
    USHORT              idsPerBus;                            // Export number of IDs per bus
    USHORT              adapterBusId[MAX_BUS_COUNT];          // Export adapter bus IDs
    USHORT              maxDataSegments;                      // Export max data segment count
} BD_INQUIRY_DATA, *PBD_INQUIRY_DATA;
```

Thus, the above data structure is used to export the enhanced SCSI miniport options. The inquiry data structure also exports the startIoRoutine backdoor StartIO entry address with the associated startIoContext pointer, used for passing StartIO context information. In addition, the inquiry data structure exports a backdoor resetRoutine entry address and associated resetContext, used by the NDIS miniport 502 to cause the SCSI miniport 508 to initiate an HBA reset. Furthermore, the inquiry data structure is used to export the numberBuses, IdsPerBus, and BusIds parameters, to thereby pass the adapter bus count, the number of IDs per bus, and the bus adapter IDs.

In one embodiment, the enhanced SCSI miniport supported options include support for a filter driver, support for the enhanced NDIS NIC miniport driver, and support for a port database. The options are defined as follows:

```
// IOCTL_BD_INQUIRY options
#define BDI_FILTER_SUPPORT    0x00000001  // Filter driver supported
#define BDI_LAN_SUPPORT       0x00000002  // LAN driver supported
#define BDI_PORT_DATABASE     0x00000004  // Port database supported
```

The second command used to enhance the StartIO routine is termed the IOCTL Backdoor Enable command, or the "IOCTL_BD_ENABLE" command. The IOCTL_BD_ENABLE backdoor enable command is issued by the network driver to enable backdoor operation with the enhanced SCSI miniport driver 508. After locating host adapters associated with enhanced miniport drivers using the inquiry command, and after completing initialization of the host adapters, the network driver issues the enable command to enable the link to the enhanced SCSI miniport driver 508. For the embodiment where network packets are encapsulated in storage or I/O packets, the following data structure is used with the IOCTL_BD_ENABLE command to import to corresponding data to the enhanced SCSI miniport 508:

host system. This routine will normally be called for fast posting command completion through mailbox registers. A flag in the SRB extension is used to identify the backdoor SRBs. For those commands, the SRB extension also contains the pointer and parameter for the Command Completion callback routine. This callback routine is part of an upper SCSI layer driver or the network driver and is called by the ISR to return the completed command to the appropriate driver.

In addition, the ISR also handles other various asynchronous events posted by the adapter. In one embodiment, for most of these events, the ISR will set a flag representing the event in the device extension and schedule the execution of the interrupt DPC routine to further process the event. The interrupt DPC routine is also scheduled to process com-

```
typedef struct      _BD_ENABLE_DATA
{
    ULONG                 options;              // Import driver supported options
    PNOTIFY_CALLBACK      notifyRoutine;        // Import notification routine
    PVOID                 notifyContext;        // Import notification parameter
    PPORT_DATA_CALLBACK   portDataUpdateRoutine;// Import port database routine
    PVOID                 portDataUpdateContext;// Import port database parameter
    PGET_BUFFER_CALLBACK  getBufferRoutine;     // Import get buffer routine
    PVOID                 getBufferContext;     // Import get buffer parameter
    USHORT                receiveBufferCount;   // Import buffer count
} BD_ENABLE_DATA, *PBD_ENABLE_DATA;
```

The backdoor enable options include the following:

```
// IOCTL_BD_ENABLE options
#define BDE_NOTIFY_ROUTINE    0x00000001  // Notify routine imported
#define BDE_DATABASE_ROUTINE  0x00000002  // Port database routine imported
#define BDE_BUFFER_ROUTINE    0x00000004  // Get buffer routine imported
```

For the embodiment where network packets are embedded in SCSI commands, a backdoor StartIO routine is called by the network miniport driver for sending the network packets that are to be embedded in SCSI commands. The backdoor StartIO routine is similar to the StartIO routine described above. For the embodiment which encapsulates network packets in storage or I/O packets, this routine builds an I/O command block (IOCB) in the command request queue and passes the SCSI command to the host bus adapter processor for execution. SRBs use the SRB extension described above to pass in the scatter/gather list for the command. The standard StartIO routine runs at the same IRQ level as the Interrupt Service routine (ISR), while this routine is called at DISPATCH_LEVEL or lower. Therefore, the backdoor StartIO routine uses the saved IRQ level from the device extension and raises its IRQL to the same level as the standard start IO routine before acquiring the spinlock to access the request queue or the SRB queue.

The Interrupt Service routine (ISR) is called by the SCSI port driver when an adapter is requesting service from the mands that are completed through the adapter response queue and incoming target mode requests from the host adapter.

Thus, for example, the interrupt DPC routine is scheduled by the Interrupt Service routine to handle more time consuming tasks, such as error handling. The IRQ level is set to DISPATCH_LEVEL for the DPC routine. When accessing the adapter request queue and the SRB queue, this routine raises the IRQL to the saved start IO level and acquires the spinlock. The following is an exemplary list of tasks which may be performed by the interrupt DPC routine:

Upon detection of fatal error, the DPC routine returns all commands and reinitializes adapter.

Upon detection of a bus reset, the DPC routine cleans up queued commands, restarts the host adapter queue, and notifies other connected drivers. If an upper layer SCSI driver and/or network drivers imported a Notify routine, the Notify routine is called with a ResetDetected event code.

Upon receipt of a port database updated event from the host adapter, the DPC routine obtains updates from the host adapter and updates data in the SCSI miniport device extension. If an upper layer SCSI driver and/or network drivers imported a Port Database callback routine, the Port Database callback routine is called with a pointer to the updated port database in the SCSI miniport device extension.

The DPC routine handles host adapter response queue entries. Commands with an error status are returned through the response queue. The response queue is also used for supporting target mode operation. To support the network driver, the enhanced SCSI miniport driver 508 includes support for I/O command block-types needed for target mode.

For incoming network data packets, the host adapter sends the SCSI miniport driver 508 an ATIO (accept target I/O) entry in the response queue. The SCSI miniport driver 508, in-turn, calls the Get Buffer routine imported from the network miniport driver to get an address of a free buffer which can be used as a destination buffer. The SCSI miniport driver 508 then sends a CTIO (continue target I/O) entry to the host adapter, passing the destination buffer address for the incoming data packet. When the data transfer is complete, the host adapter fast posts the completion through the mailbox registers, and the ISR will call the network driver Command Completion callback routine, passing the received packet to the NDIS miniport driver 502.

The DPC routine is used to start commands waiting in the SRB queue.

The Reset routine resets the bus and cleans up outstanding commands. The Reset routine is typically called when a command timeout, or the like, occurs. A Reset routine entry point is exported to one or more upper layer SCSI drivers and the network drivers. When the Reset routine is called from the SCSI port, the IRQ level is set to the same level as the ISR. When called from the backdoor drivers, the IRQ level is set to DISPATCH_LEVEL. When accessing the SRB queue from this routine, the current IRQ level is checked and, if not at ISR level, raised, before acquiring the spinlock.

The SCSI miniport Database routine is called from the interrupt DPC routine when a port database updated asynchronous event is received from the bus adapter. The asynchronous event may be the "hot" insertion or removal of a "hot plug" device, necessitating the update of the port database. The Database routine issues mailbox commands to the bus adapter to get the port data and to update the port database in the device extension. If the upper SCSI driver layers and/or network drivers imported a Port Database callback routine, the routine is called with a pointer to the updated port database in the SCSI device extension.

The enhanced NDIS miniport routines and data structures will now be described. As previously discussed, in one embodiment the NDIS miniport 502 is enhanced to permit network and I/O protocols to be transferred using the same host adapter over the same communications link. For example, in the embodiment where the NDIS miniport 502 performs an Ethernet emulation, an adapter control block structure is allocated for each Ethernet emulation driver initialization. This adapter control block structure includes the following data:

A current network address created from a host adapter IEEE ID and an adapter bus ID, where the physical address is encapsulated in the network address. The encapsulation of the physical SCSI address within the network address allows the encapsulation of IP packets in SCSI packets to be accomplished quickly, with little overhead.

Current packet filter flags passed down from higher-level network driver.

The backdoor start IO entry point and parameter exported from the SCSI enhanced miniport driver.

A queue of free send buffers.

A queue of free receive buffers.

A queue of received data packets.

A multicast list passed down from higher-level network driver.

A broadcast list of other adapters on the bus, built from the port database.

Statistical counters.

The following is a description of various routines used in conjunction with the enhanced NDIS miniport 502.

Typically, an NDIS Driver Entry routine is the first routine executed when the NDIS miniport driver is loaded. The NDIS Driver Entry routine is responsible for registering the NDIS miniport driver 502 with the NDIS layer and exporting other driver entry points and driver characteristics.

An NDIS miniport Initialization routine is then executed once for each Ethernet emulation installed. This NDIS miniport Initialization routine performs one or more of the following tasks:

The Initialization routine scans for the next available bus adapter being managed by an enhanced SCSI miniport driver 508 using the Backdoor Inquiry IOCTL command.

The Initialization routine allocates and initializes the adapter control block described above.

The Initialization routine allocates and initializes a queue of send buffers. An SRB and SRB extension is allocated and initialized for each buffer.

The Initialization routine allocates and initializes a queue of receive buffers. An SRB and SRB extension is allocated and initialized for each buffer.

The Initialization routine initializes DPC routines.

The Initialization routine sends the Backdoor Enable IOCTL described above to the enhanced SCSI miniport driver and exports the Get Buffer routine and the Port Database callback routine.

A Send routine is called by a higher-level network driver to transmit a data packet on the communication link. In one embodiment, the Send routine allocates the next available send buffer and moves the discontiguous data packet into the contiguous send buffer. In another embodiment, a discontiguous scatter/gather list is built within the SRB extension. Small segments, 256 bytes or less in size, may be loaded into a small buffer and passed as one segment. Larger packets may then be sent with the corresponding scatter/gather list.

The SRB associated with the send buffer is initialized with a SCSI Send CDB (command data block) and sent to the enhanced SCSI miniport driver 508 through the backdoor Start 10 routine. The destination address at the front of the data packet is checked for the unique broadcast address (for example, all Fs). If the packet is a broadcast message, the Send routine will send it to the addresses in the broadcast list. Thus, an IP broadcast may be simulated by sending the same packet to every node in the driver's broadcast list. If no send buffer is available, the Send routine will set a flag indicating the send queue is stopped and return an NDIS_STATUS_RESOURCES error status. As discussed below, in another embodiment, the broadcasting may be handled by an IP-capable host bus adapter. Hence, the broadcast list is not included in the adapter control block structure.

A Send Callback routine is exported to the enhanced miniport driver in the SRB extension. After transmitting the network data packet, the enhanced SCSI miniport driver 508 calls the Send Callback routine from its interrupt service routine. The Send Callback routine returns the send buffer to the queue of free send buffers and checks the queue stopped flag to see if the send queue is stopped. If stopped, this routine will schedule the execution of a send DPC routine.

The send DPC routine is scheduled by the Send Callback routine upon the stoppage of the send queue resulting from a shortage of send buffers. The send DPC routine is responsible for notifying the appropriate higher level network driver that resources are now available to receive additional packets. This notification is performed by a standard NdisM-SendResourcesAvailable call. However, prior to issuing this call, the send DPC routine needs to synchronize with other network miniport functions by acquiring a network miniport spinlock using the standard NdisIMSwitchToMiniport call. The spinlock is returned with a call to NdisIMRevertBack.

A Receive Buffer routine is exported to the enhanced SCSI miniport driver 508 via the Backdoor Enable IOCTL function. When the enhanced SCSI miniport 508 receives a SCSI Send CDB from a second host adapter on a shared bus, the enhanced SCSI miniport 508 calls the Receive Buffer routine to obtain a free receive buffer for an incoming data packet.

A Receive Callback routine is used to insert the receive buffer into the queue of received packets and to schedule the execution of a receive DPC routine. After receiving an incoming data packet, the enhanced SCSI miniport driver 508 calls this routine from its interrupt service routine. The Receive Callback routine is exported to the enhanced miniport driver in the SRB extension.

The receive DPC routine is scheduled by the Receive Callback routine after queuing an incoming data packet. The receive DPC routine is responsible for passing the received packets up to the protocol driver using standard Ndis-MEthIndicateReceive and NdisMEthIndicateReceiveComplete calls. This backdoor routine also needs to synchronize with other network miniport functions by acquiring and releasing the network miniport spinlock using NdisIM-SwitchToMiniport and NdisIMRevertBack calls.

The receive DPC routine also includes support for packet filtering and multicast lists. The packet filtering flags and the multicast list are passed down to the network miniport via NDIS_OID functions described below. The destination address at the front of the data packet indicates the type of message, for example, direct address, broadcast, or multicast message types. The receive DPC routine enforces the filter flags, discarding the types of messages that the higher level driver is not interested in receiving. If multicast messages are enabled and a multicast message is received, the receive DPC routine verifies that the packet destination address is in the multicast list prior to passing the packet up to the protocol driver. The receive buffers are returned to the queue of free receive buffers after the data packet has either been passed up to the protocol driver or discarded.

In another embodiment, a single DPC routine handles both the task of notifying the higher level driver that resources are available to send packets, and the task of passing packets to the protocol driver.

The Port Database callback routine is exported to the enhanced miniport driver via the Backdoor Enable IOCTL function. As previously described, this routine is called by the SCSI miniport driver 508 initially from the IOCTL function and later whenever the port database is updated. This routine scans the port database looking for host adapters on the bus. Each adapter found is added to the broadcast list maintained in the adapter control block so that the driver has a current broadcast list.

A Query Information routine handles NDIS_OID (NDIS Object Identifier) query requests from higher-level network drivers. Each NDIS driver contains an information block in which the driver stores dynamic configuration information, such as a multicast address list, and statistical information that a management entity can query or set. Each information element within the information block is typically referred to as an object. An Object identifier (OID) is used to refer to the object. Thus, a management entity needs to provide an appropriate OID when querying or setting a given object.

A Set Information routine handles NDIS_OID requests from higher-level network drivers to pass information to the network miniport driver. The Set Information routine is used to pass down the filter flags and the multicast list to the network miniport driver.

The embodiment where network and storage packets are transferred between computer systems using standard IP and SCSI protocols, rather than by encapsulating IP packets in SCSI packets, will now be described. The data structures and routines for this embodiment are similar to the data structures and routines for the "encapsulation" embodiment described above, with the following modifications. In general, the modifications enable the NDIS miniport driver 502 and the HBA processor to send network unencapsulated IP packets and the associated scatter/gather lists to be sent to the HBA processor. Furthermore, the modifications allow the receive buffers to be immediately pushed onto the HBA processor receive buffer queue, rather than having the enhanced SCSI miniport 508 get the receive buffers from the enhanced NDIS miniport 502 when requested. The modifications help take advantage of HBAs that support both network and I/O protocols.

Several routines and data structures are substantially the same as for the "encapsulation" embodiment. For example, the enhanced SCSI miniport Driver Entry routine and Reset routine are substantially the same for both the present embodiment and the "encapsulation" embodiment. Similarly, the enhanced NDIS miniport Send Callback routine, Query Information routine and Set Information Routine are substantially unaltered.

First, modifications to the SCSI miniport driver routines and structures will be discussed. The SCSI driver object extension structure previously described is modified to provide storage for additional data imported from the enhanced NDIS miniport 502. In addition, the SCSI driver object extension structure is modified to include a queue for passing receive buffers to the HBA processor for incoming IP packets, and to support a separate port database used to contain a list of connected IP devices. The additional data imported from the enhanced NDIS miniport 502 includes information relating to the receive buffers and the Return-Receive routine, as illustrated below in the backdoor enable data structure BD_ENABLE_DATA.

As the HBA supports both I/O and network protocols, and can therefore receive IP packets directly, the HBA does not need to support SCSI target mode. The SCSI miniport Find Adapter routine may therefore be modified to eliminate support for the SCSI target mode. Thus, the Find Adapter routine no longer needs to initialize data for the SCSI target mode. The Find Adapter routine may be further modified to initialize the IP receive buffer queue. Support for the SCSI target mode may also be eliminated from the Interrupt DPC Routine.

The SCSI miniport Initialize Adapter routine may be similarly modified to remove support for the SCSI target mode. For example, the Initialize Adapter routine no longer needs to enable target mode in the HBA. The Initialize Adapter routine may be further modified to enable the IP mode in the HBA and to pass the receive buffer queue address to the HBA.

As illustrated below, the BD_INQUIRY_DATA data structure is modified to export additional information from the enhanced SCSI miniport driver 508 to the NDIS miniport driver 502. For example, the data structure includes a pointer to the receive buffer queue, as well as the size of the receive buffer queue, which can be passed to the NDIS miniport driver 502. This allows the NDIS miniport driver 502 to directly pass the free receive buffers to the HBA processor. Furthermore, an Add Buffers backdoor routine entry is also passed to the NDIS miniport driver 502. The Add Buffers backdoor routine permits the NDIS miniport driver 502 to inform the SCSI miniport driver 508 if free buffers have been added to the receive buffer queue. In addition, the data structure also includes an entry for passing a Fibre Channel adapter world wide node name. Thus, rather than encapsulating the physical address in the network address, as described above, the node name may be used.

HBA. In another embodiment, the Backdoor Start IO routine is modified to handle multiple send packets on a single call from the NDIS miniport driver 502.

The Interrupt Service routine (ISR) operates substantially the same as in the "encapsulation" embodiment when sending IP packets. The SRB extension contains the pointer to the NDIS miniport Callback routine, which is used for returning the send buffer to the NDIS miniport 502. For incoming receive IP packets, the HBA processor takes empty receive buffers from the receive buffer queue as needed. When an entire packet has been received into one or more receive buffers, the HBA interrupts the host. The ISR

```
typedef struct _BD_INQUIRY_DATA
{
    ULONG               Options;                // Export miniport supported options
    PSTARTIO_BACKDOOR   StartIoRoutine;         // Export backdoor StartIo entry
    PVOID               StartIoContext;         // Export miniport DevExt pointer
    PRESET_BACKDOOR     ResetRoutine;           // Export backdoor Reset entry
    PVOID               ResetContext;           // Export miniport DevExt pointer
    USHORT              ReceiveBufferQueueSize; // Export receive buffer queue size
    PVOID               ReceiveBufferQueue;     // Export receive buffer queue pointer
    PBUFFERS_BACKDOOR   AddBuffersRoutine;      // Export backdoor Add Buffers entry
    PVOID               AddBuffersContext;      // Export miniport DevExt pointer
    UCHAR               acNodeName[8];          // Export adapter node name
} BD_INQUIRY_DATA, *PBD_INQUIRY_DATA;
```

The _BD_ENABLE_DATA data structure is correspondingly modified to import additional information from the enhanced NDIS miniport driver 502 to the enhanced SCSI miniport driver 508. For example, the data structure is used to import the size of each receive buffer and the maximum size of IP packets supported. The data structure is also used to import pointer and context parameters for the ReturnReceive routine, which is used to pass received packets from the SCSI miniport driver 508 to the NDIS miniport driver 502. The data structure also is used to import the IP address for NIC emulation. Note that the NDIS miniport 502 no longer imports the Port Database routine, the Get Buffer routine, or the Notification Routine. The NDIS miniport driver 502 does not need the port database, because all addressing is handled by the SCSI miniport driver 508. In the present embodiment, the SCSI miniport driver 508 takes the network node name in the IP packet header, searches for a corresponding Loop ID in the IP port database, and provides the Loop ID to the HBA.

routine then passes the received packet to the NDIS miniport 502 using the ReturnReceivePackets callback routine.

The Port Database routine may be modified to keep a separate list of all IP type devices, such as other HBAs attached on the same Fibre loop. This list is used by the enhanced SCSI miniport 508 to get the Fibre Channel address when sending a packet. Because all Fibre Channel addressing is resolved by the SCSI miniport 508, the NDIS miniport 502 no longer uses the port database.

Modifications to the NDIS miniport driver routines and structures will be now be discussed. In one embodiment, the IP-capable HBA now handles IP broadcasting operations. Hence, the broadcast list of other loop-connected devices may be deleted from the adapter control block structure. The adapter control block structure may be further modified to provide storage for the additional information exported from the SCSI miniport driver 508, as previously discussed.

Because the NDIS miniport 502 no longer uses the port database, the Port Database Callback routine may be eliminated.

```
typedef struct _BD_ENABLE_DATA
{
    ULONG                    Options;                    // Import driver supported options
    USHORT                   ReceiveBufferCount;         // Import buffer count
    ULONG                    ReceiveBufferSize;          // Import buffer size
    ULONG                    MaximumTransferSize;        // Import maximum transfer size
    PRETURN_PACKETS_CALLBACK ReturnReceivePacketsRoutine;// Import return packets routine
    PVOID                    ReturnReceivePacketsContext;// Import return packets parameter
    PVOID                    ReceiveBufferCBs;           // Import receive buffer control blocks
    ULONG                    IpAddress;                  // Import IP address
} BD_ENABLE_DATA, *PBD_ENABLE_DATA;
```

The Backdoor Start IO routine is also modified, as it no longer needs to build an IOCB that passes SCSI commands with encapsulated IP packets to the HBA processor. Instead, in the present embodiment, the Backdoor Start 10 routine builds and sends an IOCB for sending unencapsulated IP packets, along with the associated scatter/gather lists, to the The Initialization routine may be modified to import/ export additional information to and from the SCSI miniport driver 508, as described above. In the present embodiment, SRBs and SRB extensions are no longer used to allocate or initialize receive buffer queues. Instead, the receive buffer queue is initialized by the SCSI miniport driver 508, as discussed above. The receive buffers are then directly added to the HBA processor receive buffer queue. The Initialization routine may therefore be modified to call the SCSI miniport backdoor routine, AddBuffersRoutine, which informs the SCSI miniport 508 and the HBA processor how many buffers were added to the queue.

As network data is no longer encapsulated in a SCSI command, the Send routine may be modified to no longer build the SCSI Send CDB in the SRB. Furthermore, because the IP-capable HBA now handles broadcast messages, the Send routine code that simulated an IP broadcast may be eliminated. In addition, in one embodiment, the Send routine may be modified to support NDIS calls to send multiple packets at a time. Thus, multiple send packets can be sent to the SCSI miniport backdoor Start IO routine in a single call.

In one embodiment, the Send DPC routine and the Receive DPC routine may be combined into a single DPC routine to handle both functions. After the received packets have been indicated up the driver layer stack to higher level network drivers, the free receive buffers are returned directly to the HBA processor receive buffer queue. The SCSI miniport backdoor routine, AddBuffersRoutine, is called to notify the SCSI miniport and the HBA processor of the additional free buffers.

In the present embodiment, all free receive buffers are immediately pushed onto the HBA processor receive buffer queue. Therefore, the Receive Buffer routine may be completely removed.

No changes to the Receive Callback routine are needed. However, the Receive Callback routine pointer is now imported to the SCSI miniport driver 508 via the IOCTL command, instead of by the SRB extension.

While certain preferred embodiments of the invention have been described, these embodiments have been presented by way of example only, and are not intended to limit the scope of the present invention. Accordingly, the breadth and scope of the present invention should be defined only in accordance with the following claims and their equivalents.

What is claimed is:

1. A system for sending both network and storage protocols over the same host adapter, said system comprising:
   a network driver, including at least one network miniport;
   a SCSI miniport driver layer coupled to said network driver to receive network related information from said network miniport;
   a SCSI driver layer higher than said SCSI miniport driver layer, said higher SCSI layer passing storage related information to said SCSI miniport driver layer;
   a bus adapter coupled to said SCSI miniport driver layer, wherein said SCSI miniport driver layer transfers both network and storage related information to said bus adapter; and
   a communication medium link coupled to said bus adapter, wherein said communication link is configured to receive both said network related information and said storage related information transferred from the SCSI miniport driver layer, and said communication medium link is configured to couple a first computer system to a second computer system.

2. The system for sending both network and storage protocols over the same host adapter as defined in claim 1, wherein said network driver includes at least a intermediate driver.

3. The system for sending both network and storage protocols over the same host adapter as defined in claim 1, wherein said communication medium link is fibre channel-compatible.

4. The system for sending both network and storage protocols over the same host adapter as defined in claim 1, wherein said communication medium link is SCSI-compatible.

5. The system for sending both network and storage protocols over the same host adapter as defined in claim 1, wherein said network related information is transferred using an Ethernet protocol.

6. The system for sending both network and storage protocols over the same host adapter as defined in claim 1, wherein said storage related data is transferred using a SCSI protocol.

7. The system for sending both network and storage protocols over the same host adapter as defined in claim 1, wherein said storage related data is transferred using a fibre channel protocol.

8. The system of claim 1, wherein the SCSI miniport driver can process multiple packets send in a single call by the network miniport.

9. The system of claim 1, wherein the SCSI miniport driver builds control blocks for sending unencapsulated data packets along with scatter/gather lists to the bus adapter.

10. A method of transferring data using a storage protocol and a network protocol over the same host adapter, said method comprising the acts of:
    transferring storage data from an upper layer storage driver layer to a lower layer storage driver;
    transferring network data from a network driver to said lower layer storage driver; and
    transferring said storage data and said network data to a communication link interface circuit.

11. The method of transferring data as defined in claim 10, wherein said lower layer storage driver is a miniport driver.

12. The method of transferring data as defined in claim 10, wherein said upper layer storage driver is a port driver.

13. The method of transferring data as defined in claim 10, wherein said network driver includes at least a network miniport driver.

14. The method of transferring data as defined in claim 10, further comprising the act of encapsulating said network data in a storage command.

15. The method of transferring data as defined in claim 10, further comprising the act of passing a network scatter/gather list to said lower layer storage driver.

16. The method of transferring data as defined in claim 10, further comprising the act of determining if said lower layer storage driver supports an interface to said network driver.

17. A system for sending both network and storage data using the same driver, said system comprising:
    a network driver; and
    a storage driver coupled to said network driver to receive network related information, said storage driver configured to receive storage related information from an operating system, and said storage driver configured to transfer both said network and said storage related data to an interface card.

18. The system for sending both network and storage data as defined in claim 17, wherein said storage driver further comprises at least one entry point for communication with said network driver.

19. The system for sending both network and storage data as defined in claim 17, further comprising a spinlock managed by said storage driver, said spinlock used to control access to at least a first resource.

20. The system for sending both network and storage data as defined in claim 17, wherein said interface card is configured to be coupled to a fibre channel network.

21. The system for sending both network and storage data as defined in claim 17, wherein said interface card is configured to be coupled to a SCSI bus.

22. A device driver for communicating both network and storage information over the same interface circuit, said device driver comprising:

a first entry point used to receive storage data intended for transfer to at least one communication link; and a second entry point used to receive network data intended for transfer to said at least one communication link; and an interface used to communicate said storage data using a storage protocol and said network data using a network protocol to a communication link interface circuit.

23. The device driver as defined in claim 22, further comprising at least a standard Windows NT class layer.

24. The device driver as defined in claim 22, further comprising at least a class layer, a port layer, and a miniport layer, wherein said second entry point is associated with said miniport layer.

25. A networked system, including at least two computer systems coupled by a communication link which transfers data between said computer systems using both network and storage protocols, said system comprising:

at least a first processor located in at least a first of said at least two computer systems;

a first operating system configured to be executed by said first processor;

a first network driver configured to be executed by said first computer system, said first network driver having an interface used to receive network related information from said operating system; and a first storage driver, configured to be executed by said first computer system, said first storage driver having at least a first interface used to receive said network related information from said network driver, and said first storage driver having at least a second interface used to receive storage related information from said operating system;

a first bus adapter in communication with said first storage driver, said first bus adapter used to receive both said network related information and said storage related information; and a communication medium in communication with said first adapter, said communication medium used to transfer both said network and said storage related data, using respectively, a network protocol and a storage protocol, to at least a second of said at least two computer systems.

26. The networked system as defined by claim 25, further comprising:

a second host adapter coupled to at least a second processor in a second of said at least two computers, said second host adapter coupled to said communication medium; and a second storage driver, configured to be executed by said second computer system, said second storage driver having at least a first interface used to receive said network related information and storage related information from said second host adapter;

a second network driver configured to be executed by said second computer system, said second network driver having at least a first interface for receiving network related information from said storage driver; and a second operating system configured to be executed by at least a first processor of said second computer system, said second operating system having at least one interface for receiving information from said storage driver and said network driver.

27. The networked system as defined by claim 25, wherein said communication medium is a fibre channel.

28. The networked system as defined by claim 25, wherein said communication medium is SCSI-compatible.

29. The networked system as defined by claim 25, wherein said first operating system is Windows NT.

30. The networked system as defined by claim 25, wherein said first computer system further comprises at least a second processor configured to execute said first operating system.

31. A networked system, including at least two computer systems coupled by at least two communication links, said networked system comprising:

a first computer system;

a second computer system;

a first communication link coupling said first computer system and said second computer system, said first communication link configured to transfer data using an I/O protocol;

a second communication link coupling said first computer system and said second computer system, said second communication link configured to transfer data using a network protocol;

a failure detection routine configured to detect the failure of said first communication link and said second communication link, wherein upon detecting the failure of either of said first and said second communication links, said failure detection routine causes both I/O and network protocols to be used to transfer, respectively, storage and network data, on the non-failed communication link.

32. The networked system as defined by claim 31, wherein said I/O protocol is a SCSI protocol.

33. A method of providing redundant communication between at least two computer systems, said method comprising the acts of:

transferring data over a first communication link using an I/O protocol;

transferring data over a second communication link using a network protocol;

detecting when either said first communication link or said second communication link have experienced at least a first mode of failure;

transferring data using said network protocol over said first communication link in response to detecting said failure in said second communication link; and transferring data using said I/O protocol over said second communication link in response to detecting said failure in said first communication link.

34. A device driver for communicating both network and storage information using the same interface circuit, said device driver comprising:

a first interface used to receive storage data intended for transfer to at least one communication link; and a second interface used to receive network data intended for transfer to at least one communication link; and a third interface used to communicate said storage data using said storage protocol and said network data, where said network data is encapsulated using said storage protocol, to a communication link interface circuit.

35. A device driver for communicating both network and I/O information using the same interface circuit using respectively network and I/O protocols, said device driver comprising:

a means for receiving I/O data intended for transfer to at least one communication link; and a means for receiving network data intended for transfer to at least one communication link; and a means for communicating said I/O data using an I/O protocol and said network data using said network protocol to a means for interfacing to a communication medium.

* * * * *